(12) United States Patent
Mook et al.

(10) Patent No.: US 8,658,327 B2
(45) Date of Patent: Feb. 25, 2014

(54) FUEL CELL STACKING AND SEALING

(75) Inventors: Gary A. Mook, Westwood, MA (US); Kevin H. Negrotti, Waltham, MA (US); Hugh L. Smith, Canton, MA (US); Norman F. Bessette, Middleboro, MA (US); Kenneth Shown, Southbridge, MA (US); Timothy Near, Alpharetta, GA (US); Raymond England, Harrisville, RI (US)

(73) Assignee: Acumentrics Corporation, Westwood, MA (US)

( * ) Notice: Subject to any disclaimer, the term of this patent is extended or adjusted under 35 U.S.C. 154(b) by 1363 days.

(21) Appl. No.: 10/371,242

(22) Filed: Feb. 20, 2003

(65) Prior Publication Data

US 2003/0235745 A1  Dec. 25, 2003

Related U.S. Application Data

(60) Provisional application No. 60/358,241, filed on Feb. 20, 2002, provisional application No. 60/358,182, filed on Feb. 20, 2002, provisional application No. 60/358,191, filed on Feb. 20, 2002.

(51) Int. Cl.
*H01M 8/02* (2006.01)
*H01M 8/10* (2006.01)
*H01M 8/24* (2006.01)

(52) U.S. Cl.
USPC ............ 429/460; 429/466; 429/468; 429/510

(58) Field of Classification Search
USPC ............ 429/31, 35, 36, 46, 40, 18, 460, 466, 429/468, 510
See application file for complete search history.

(56) References Cited

U.S. PATENT DOCUMENTS

| 4,751,152 A | 6/1988 | Zymboly | 429/31 |
| 4,888,254 A | 12/1989 | Reichner | 429/31 |
| 5,035,962 A | 7/1991 | Jensen | 429/40 |
| 5,082,751 A | 1/1992 | Reichner | 429/19 |
| 5,108,850 A | 4/1992 | Carlson et al. | 429/31 |
| 5,143,801 A | 9/1992 | Bates | 429/33 |
| 5,273,829 A | 12/1993 | Ishihara et al. | 429/34 |

(Continued)

FOREIGN PATENT DOCUMENTS

| CA | 2414129 | 1/2002 | H01M 8/12 |
| CA | 2473449 | 8/2003 | H01M 8/24 |

(Continued)

OTHER PUBLICATIONS

Merriam-Webster's Collegiate Dictionary, 10$^{th}$ edition, p. 1117. 1998.*

(Continued)

*Primary Examiner* — Tracy Dove
(74) *Attorney, Agent, or Firm* — Sunstein Kann Murphy & Timbers LLP

(57) ABSTRACT

Various aspects of solid oxide fuel cell (SOFC) technology are described. One specific application includes a seal for connecting an outer surface of a fuel cell to a cell manifold that supports the fuel cell and delivers a fuel mixture to an inside portion of the fuel cell. The seal also separates the fuel mixture from the outer surface at the seal. And the seal is electrically conductive to allow flow of electric current between the outer surface and the cell manifold.

12 Claims, 7 Drawing Sheets

(56) References Cited

U.S. PATENT DOCUMENTS

| | | | |
|---|---|---|---|
| 5,338,623 A * | 8/1994 | Nachlas et al. | 429/31 |
| 5,342,703 A | 8/1994 | Kawasaki et al. | 429/30 |
| 5,368,667 A | 11/1994 | Minh et al. | 156/89 |
| 5,368,951 A | 11/1994 | Shiratori et al. | 429/30 |
| 5,395,704 A | 3/1995 | Barnett et al. | 429/30 |
| 5,458,989 A * | 10/1995 | Dodge | 429/31 |
| 5,492,777 A | 2/1996 | Isenberg et al. | 422/17 |
| 5,527,633 A | 6/1996 | Kawasaki et al. | 429/30 |
| 5,589,017 A | 12/1996 | Minh | 156/87 |
| 5,741,605 A * | 4/1998 | Gillett et al. | 429/31 |
| 5,788,788 A | 8/1998 | Minh | 156/62.2 |
| 5,827,620 A | 10/1998 | Kendall | 429/31 |
| 5,908,713 A | 6/1999 | Ruka et al. | 429/31 |
| 5,916,700 A | 6/1999 | Ruka et al. | 429/30 |
| 5,993,985 A | 11/1999 | Borglum | 429/30 |
| 5,998,056 A | 12/1999 | Divisek et al. | 429/41 |
| 6,221,522 B1 * | 4/2001 | Zafred et al. | 429/31 |
| 6,228,521 B1 | 5/2001 | Kim et al. | 429/33 |
| 6,379,831 B1 | 4/2002 | Draper et al. | 429/31 |
| 6,416,897 B1 | 7/2002 | Tomlins et al. | 429/31 |
| 6,656,623 B2 | 12/2003 | Holmes et al. | 429/30 |
| 6,841,284 B2 * | 1/2005 | Brown et al. | 429/31 |
| 6,998,187 B2 | 2/2006 | Finnerty et al. | 429/31 |
| 2004/0247972 A1 | 12/2004 | Kendall et al. | 429/31 |
| 2005/0042490 A1 | 2/2005 | Finnerty et al. | 429/31 |

FOREIGN PATENT DOCUMENTS

| | | | | |
|---|---|---|---|---|
| CA | 2759750 | | 8/2003 | H01M 8/06 |
| EP | 55016 | | 7/1985 | H01M 8/12 |
| EP | 55011 | | 2/1987 | H01M 8/12 |
| EP | 0 468 698 | A1 | 1/1992 | H01M 8/06 |
| EP | 372680 | B1 | 10/1993 | H01M 8/12 |
| EP | 442742 | B1 | 5/1995 | H01M 8/12 |
| EP | 0468698 | | 10/1995 | H01M 8/06 |
| EP | 505184 | B1 | 6/1997 | H01M 8/24 |
| GB | 2348315 | | 9/2000 | H01M 8/06 |
| JP | 01267963 | | 10/1989 | H01M 8/12 |
| JP | 01320773 | | 12/1989 | H01M 8/04 |
| JP | 04012461 | | 4/1990 | H01M 8/02 |
| JP | 3034258 | | 2/1991 | H01M 8/02 |
| JP | 4012461 | | 1/1992 | H01M 8/12 |
| JP | 04014766 | | 1/1992 | H01M 8/24 |
| JP | 4073867 | | 3/1992 | H01M 8/02 |
| JP | 04292866 | | 10/1992 | H01M 8/24 |
| JP | 5101842 | | 4/1993 | H01M 8/02 |
| JP | 05343079 | | 12/1993 | H01M 8/02 |
| JP | 9306525 | | 11/1997 | H01M 8/12 |
| JP | 11219710 | | 8/1999 | H01M 4/86 |
| JP | 2000182652 | | 6/2000 | H01M 8/24 |
| WO | WO99/17390 | | 4/1999 | |
| WO | WO01/24300 | A1 | 5/2001 | |

OTHER PUBLICATIONS

European Patent Office, Examination Report dated Oct. 17, 2006, pertaining to Application No. 03711138.2, 3 pages.
Elkington and Fife LLP, Response to Examination Report dated Oct. 17, 2006, pertaining to Application No. 03711138.2, 5 pages.
European Patent Office, Examination Report dated May 5, 2008, pertaining to Application No. 03711138.2, 4 pages.
Elkington and Fife LLP, Response to Examination Report dated May 5, 2008, pertaining to Application No. 03711138.2, 5 pages.
Canadian Intellectual Property Office, Office Action dated Sep. 21, 2009, pertaining to Application No. 2,516,781, 2 pages.
Gowling Lafleur Henderson LLP, Response to Office Action dated Sep. 21, 2008, pertaining to Application No. 2,516,781, 5 pages.
Canadian Intellectual Property Office, Office Action dated Jul. 30, 2010, pertaining to Application No. 2,516,781, 2 pages.
Japanese Patent Office, Office Action dated Nov. 26, 2009, pertaining to Application No. 2003-570417, 5 pages.
Japanese Patent Office, Translation of Office Action dated Jul. 30, 2010, pertaining to Application No. 2003-570417 together with an Abstract, 9 pages.
Sunstein Kann Murphy & Timbers LLP, Claims for Response to Office Action dated Jul. 30, 2010, pertaining to Application No. 2003-570417, 3 pages.
Yamaski & Partners, Response to Office Action dated Jul. 30, 2010, pertaining to Application No. 2003-570417, 12 pages.
Kato et al., "Anode-Supported Tubular SOFCs Operated at Intermediate Temperature," *Electrotechnical Laboratory*, pp. 553-560, Oct. 2000.
Song et al., "Fabrication and Characteristics of Anode-Supported Tube for Solid Oxide Fuel Cell," *Electrochemical Society Proceedings*, vol. 99-19, pp. 845-850, 1999.
Primdahl et al., "Thin Anode Supported SOFC," *Electrochemical Society Proceedings*, vol. 99-19, pp. 793-802, 1999.
Kim et al., "Polarization Effects in Intermediate Temperature, Anode-Supported Solid Oxide Fuel Cells," *Journal of the Electrochemical Society*, vol. 146(1), pp. 69-78, 1999.
Kim et al., "The Effect of Anode Thickness on the Performance of Anode-Supported Solid Oxide Fuel Cells," *Electrochemical Society Proceedings*, vol. 99-19, pp. 830-839, 1999.
Stöver et al., "Recent Developments in Anode Supported Thin Film SOFC at Research Cetre Juelich," *Electrochemical Society Proceedings*, vol. 99-19, pp. 812-821, 1999.
Gowling Lafleur Henderson LLP, Response to Official Action, Serial No. 2,516,781, Jan. 31, 2011, 8 pages.
Canadian Intellectual Property Office, Notice of Allowance, Serial No. 2,516,781, Apr. 26, 2011, 2 pages.
European Patent Office, Notice of Allowance, Application No. 03711138.2, Jun. 24, 2011, 28 pages.
Yamasaki, Translation of Decision of Rejection, Application No. 2003-570417, Jun. 2, 2011, 4 pages.
Canadian Intellectual Property Office, Office Action, Serial No. 2,759,750, Jan. 16, 2012, 2 pages.
Gowling Lafleur Henderson LLP, Response to Official Action, Serial No. 2,759,750, Jul. 13, 2012, 4 pages.
Canadian Intellectual Property Office, Office Action, Serial No. 2,759,750, Oct. 2, 2012, 2 pages.
Gowling Lafleur Henderson LLP, Response to Official Action, Serial No. 2,759,750, Apr. 2, 2013, 14 pages.
Canadian Intellectual Property Office, Notice of Allowance, Serial No. 2,759,750, Jun. 17, 2013, 1 page.

* cited by examiner

FUEL CELL STACKING AND SEALING

FIELD OF THE INVENTION

The invention generally relates to solid oxide fuel cells, and more specifically to electrical connections and gas distribution and management in fuel cell stacks.

BACKGROUND ART

A solid oxide fuel cell (SOFC) is an electrochemical device that produces direct current electricity by electrochemical combination of a fuel with an oxidant. An SOFC uses an oxygen ion-conducting electrolyte to separate an air electrode (cathode) from a fuel electrode (anode). The fuel is oxidized at the anode and electrons are released to an external circuit where they are accepted by the cathode. The cathode reaction causes the oxidant gas to be reduced to oxygen ions, which then migrate across the oxygen ion-conducting electrolyte to the anode. The movement of electrons around the external circuit produces an electromotive force (typically 1 volt for a single cell). By the application of a load across the cell, current flows, thus producing a power density, the value of which depends upon the design of the cell and the materials used. A cell typically runs at between 700 and 1000 degrees Celsius. *Science and Technology of Ceramic Fuel Cells*, by N. Q. Minh and T. Takahashi, Elsevier, Amsterdam, 1995 (incorporated herein by reference), further describes the principle reactions in an SOFC, and the methods by which electricity can be produced.

FIG. 1 shows a typical arrangement of multiple tubular fuels cells 2. The main body of each cell 2 is typically a composite metallic ceramic that is extruded into a tube shape and then sintered. In some applications, the tube may be a nickel-coated ceramic. This ceramic tube acts as an anode. An electrolyte layer, such as yttria-stabilized zirconia (YSZ), is applied over the outer surface of the anode, and a cathode layer, such as a doped lanthanum manganate ($LaMnO_3$) is applied over the electrolyte. The outer cathode is surrounded by an oxygen-containing gas such as air. In a typical system, each fuel cell might be 1-50 mm in diameter and 200-2000 mm long.

The fuel cells 2 are attached to a support manifold 5 by end caps 14. Typically, the outer cathode layer does not extend the entire length of the fuel cell 2, but rather stops somewhat short of the end cap 14 so that the end cap is mechanically coupled to the anode or electrolyte layer. Physical support of the fuel cells 2 may rely on support of the electrode structure (i.e., anode) or on support provided by the electrolyte. The support manifold 5 contains a fuel distribution plenum that delivers a fuel mixture into the interior of each fuel cell 2. The hot exhaust from the fuel cells 2 exits out the other end through a perforated plate 24 (held by support rod 26) into an exhaust plenum. Typically, the exhaust plenum also contains a heat exchanger that uses the heat of the exhaust to pre-heat the incoming air that is delivered to the exterior of the fuel cells 2.

SUMMARY OF THE INVENTION

Embodiments of the present invention are directed to various aspects of solid oxide fuel cell (SOFC) technology. One specific application includes a seal for connecting the anode surface of a fuel cell to a cell manifold that supports the fuel cell and delivers a fuel mixture to an inside portion of the fuel cell. The seal also separates the fuel mixture from the anode surface at the seal. And the seal is electrically conductive to allow flow of electric current between the anode and the cell manifold.

In a specific such embodiment, the fuel cell is a solid oxide fuel cell (SOFC). The fuel cell may have a tubular shape. The seal may be based on an alloy of at least one of gold, silver, palladium, and nickel, and may be based on inductive brazing of the alloy. The anode surface of the fuel cell may be based on a composite ceramic material such as yttria-stabilized zirconia (YSZ).

Another similar embodiment is directed to a fuel cell system having multiple fuel cells for chemically converting a fuel mixture into electric current. A cell manifold supports the fuel cells and delivers the fuel mixture to interior portions of the fuel cells. Each cell has a seal that connects its anode surface to the cell manifold and separates the fuel mixture from the outer surface at the seal. Each seal is electrically conductive to allow flow of electric current between the anode and the cell manifold.

In such an embodiment, the fuel cells may be solid oxide fuel cells (SOFC's) and may have a tubular shape. Each seal may be based on an alloy of at least one of gold, silver, palladium, and nickel and may be based on inductive brazing of the alloy. The anode surface of the fuel cell may be based on a composite ceramic material such as yttria-stabilized zirconia (YSZ). Each fuel cell may further include an outer cathode layer, for example, based on lanthanum manganate.

Such a system may have multiple cell manifolds, wherein each manifold holds a plurality of fuel cells in a common plane, and wherein the fuel cells attached to each manifold are connected in electrical parallel. The multiple cell manifolds may be arranged in a vertical stack of fuel cells, and may be connected in electrical series. Each fuel cell may be connected to the cell manifold by an inductively brazed end cap that is threaded or press fitted.

An embodiment of the present invention also includes multiple fuel cells for chemically converting a fuel mixture into electric current, and an insulation block having opposing sides and penetrated by a portion of each fuel cell. The fuel cells and the insulation block are arranged such that when the fuel cell system is operating: (i.) on one side of the insulation block ambient temperature is sufficiently high to allow for normal operation of the fuel cells, and (ii.) on the other side of the insulation block ambient temperature is significantly lower than on the operating side so as to allow for formation of a conventional mechanical seal at each fuel cell that separates a fuel mixture entering the fuel cell interior from an outer surface of the fuel cell.

In such an embodiment, the fuel cells may be solid oxide fuel cells (SOFC's) and/or have a tubular shape. The outer surface of each fuel cell may be based on a composite ceramic material such as yttria-stabilized zirconia (YSZ). Each fuel cell may further include an outer cathode layer, for example, based on lanthanum manganate. The fuel cells may be arranged in multiple planar layers, wherein the fuel cells in each layer are connected in electrical parallel, and wherein the multiple layers are connected in electrical series.

An embodiment of the present invention is also directed to a fuel cell system having multiple tubular fuel cells for chemically converting a fuel mixture into electric current. The fuel cells are arranged into a plurality of planar layers, each planar layer comprising a plurality of fuel cells arranged in a common plane.

In a further such embodiment, the tubular fuel cells may be solid oxide fuel cells (SOFC's). The outer surface of each fuel cell may be based on a composite ceramic material such as yttria-stabilized zirconia (YSZ). Each fuel cell may further include an outer cathode layer, for example, based on lanthanum manganate. The fuel cells in each layer may be connected in electrical parallel, and the multiple layers may be connected in electrical series.

An embodiment of the invention also includes a burner assembly for heating an input light hydrocarbon gas; a fuel reformer assembly heated by the burner assembly for converting the input light hydrocarbon gas into a fuel mixture rich in hydrogen and carbon monoxide and having a low partial pressure of oxygen; and a fuel cell stack assembly containing a plurality of fuel cells for chemically converting the fuel mixture into electric current.

In such an embodiment, the fuel reformer assembly may include a catalyst element for converting the input light hydrocarbon gas. There may also be a bypass mechanism for diverting cooling air from the catalyst tube during system cool down. The system may also include a recuperator assembly for receiving hot exhaust gas from the fuel cell stack assembly and preheating input air to the fuel cell stack assembly. In any such embodiment, the fuel cells may be solid oxide fuel cells (SOFC).

Similarly, an embodiment may include a method of operating a fuel cell system, including heating an input light hydrocarbon gas; converting the input light hydrocarbon gas into a fuel mixture rich in hydrogen and carbon monoxide and having a low partial pressure of oxygen; and chemically converting the fuel mixture into electric current using a fuel cell stack assembly containing a plurality of fuel cells.

In such a method, the converting the input light hydrocarbon gas may use a catalyst element. The converting the input light hydrocarbon gas also may include diverting cooling air from the catalyst tube during system cool down. The method may further include receiving hot exhaust gas from the fuel cell stack assembly and preheating input air to the fuel cell stack assembly. In any such method, the fuel cells may be solid oxide fuel cells (SOFC).

BRIEF DESCRIPTION OF THE DRAWINGS

The present invention will be more readily understood by reference to the following detailed description taken with the accompanying drawings, in which.

DETAILED DESCRIPTION OF SPECIFIC EMBODIMENTS

Embodiments of the present invention are directed to various aspects of solid oxide fuel cell (SOFC) technology. Although the following description focuses on tubular SOFC designs, various embodiments are applicable to other specific fuel cell approaches.

Stable fuel cell performance partly depends on a proper fuel mixture composition entering the interior of the fuel cells. If the incoming fuel mixture is not sufficiently low in oxygen partial pressure during heating and cooling, nickel oxidation can degrade the anode microstructure. In addition, volumetric expansion of nickel or nickel oxide in the anode can cause electrolyte cracking. Some prior art approaches seek to avoid this by using bottled hydrogen, nitrogen, or other inert gases. Some designs have also relied on the formation of steam by bringing in external water which may or may not include a small percentage of hydrocarbon fuel.

Figure 1:
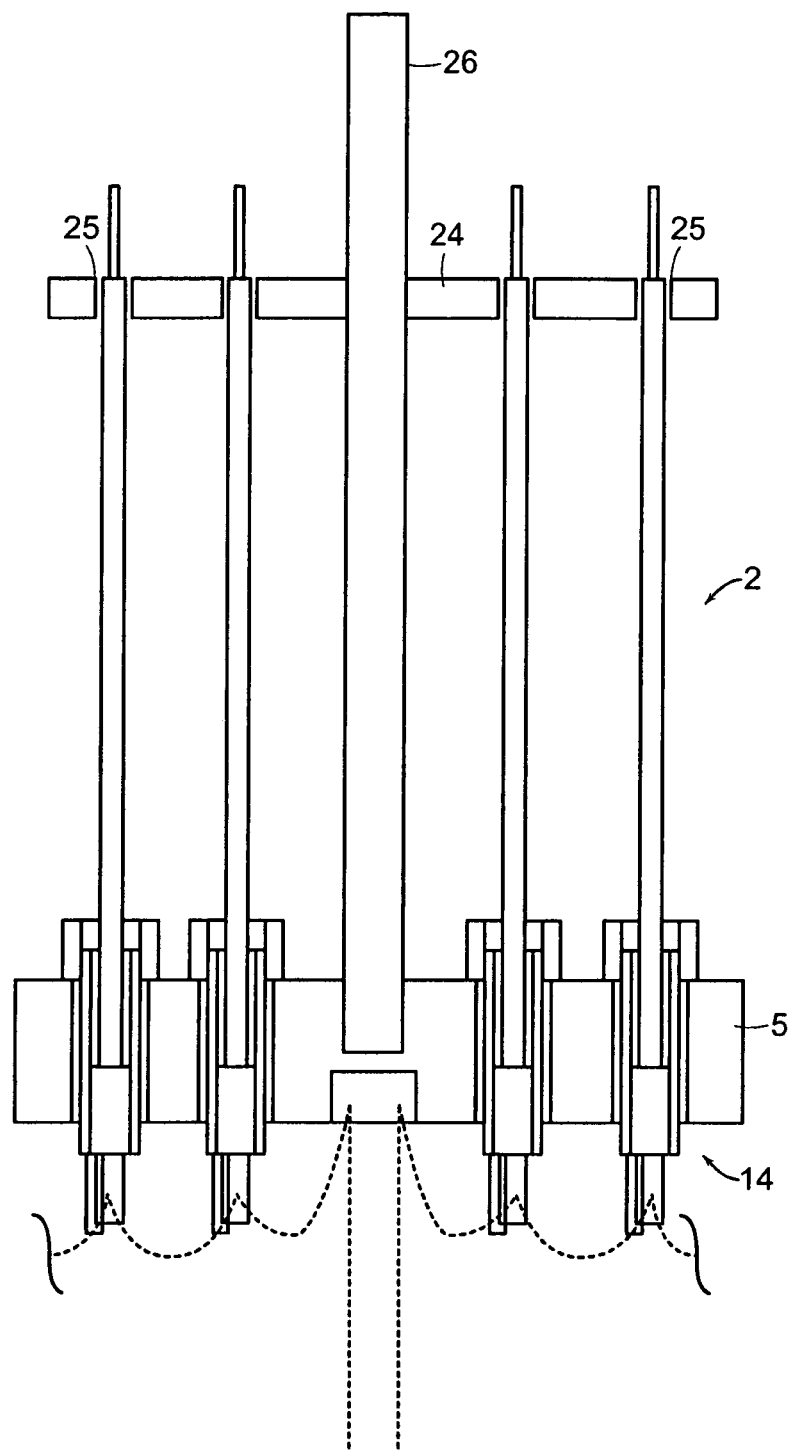
FIG. 1 shows a typical arrangement of multiple tubular fuel cells according to the prior art.
Figure 2:
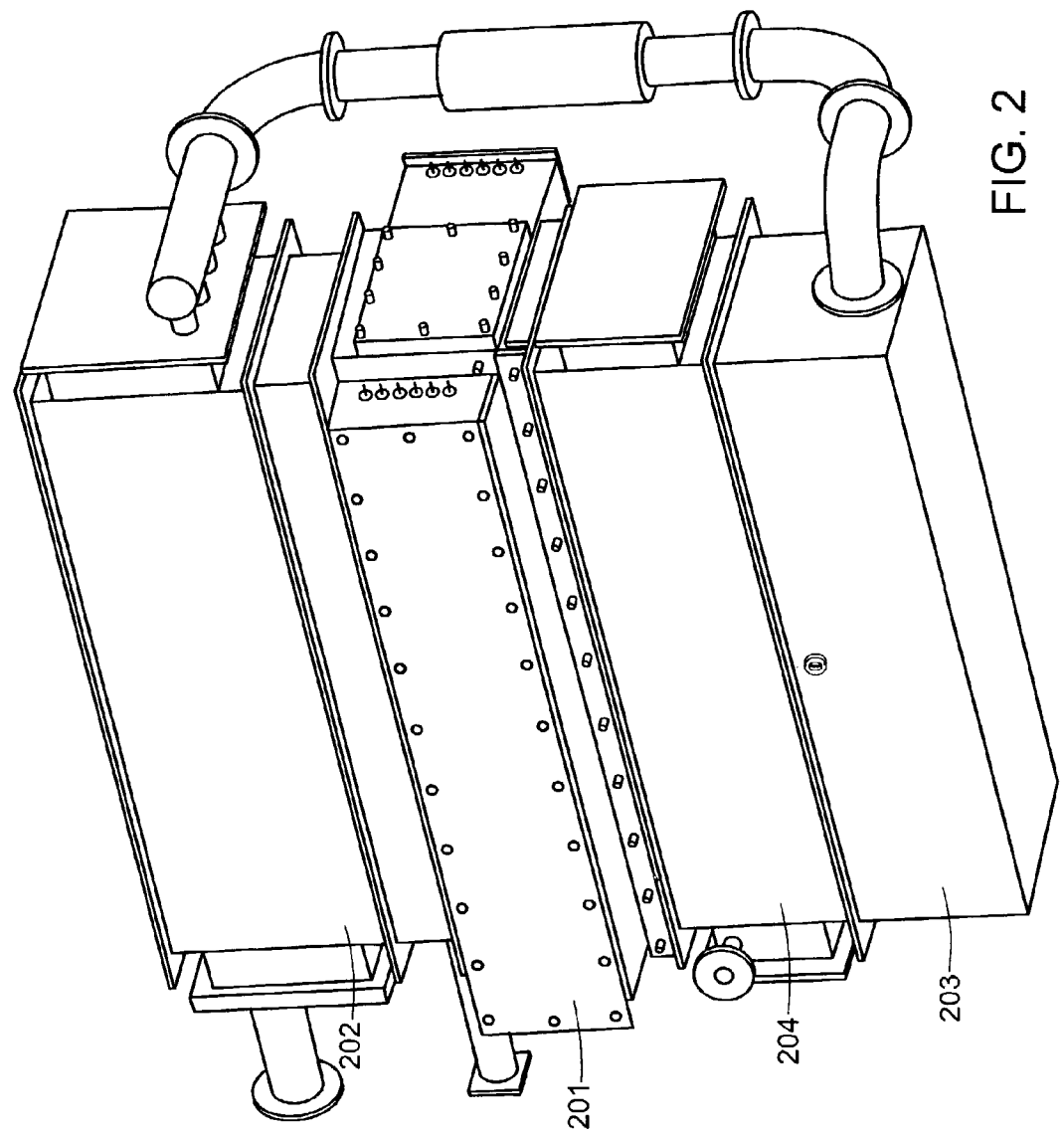
FIG. 2 shows an SOFC system according to one specific embodiment of the present invention.

Embodiments of the present invention use a cross-flow stack configuration to produce on-demand a fuel mixture having a low partial pressure of oxygen. FIG. 2 shows one specific embodiment in which a fuel cell stack assembly 201 exhausts to a recuperator assembly 202 which contains a heat exchanger to preheat incoming air to the stack assembly 201. Distribution plenum and burner 203 is fired when starting up a cold system, heating its housing and fuel reformer assembly 204, which includes a tube which may contain a reforming catalyst. The temperature of the catalyst tube in the fuel reformer assembly 204 rises rapidly, causing significant catalytic activity that reforms light hydrocarbons in the fuel into a rich mixture of hydrogen and carbon monoxide. This reformed fuel mixture is delivered to the interior of the fuel cells (anode) before the temperature in the fuel cell stack assembly 201 rises to where oxidation or cell damage might occur.

For system shutdown, air can bypass the catalyst tube in the fuel reformer assembly 204 to allow the reformer to remain hot and catalytically active while the fuel cell stack assembly 201 cools. Thus, during cool down transients a low partial pressure of oxygen can be maintained in the fuel mixture. This approach provides internal generation of gas having low partial pressure of oxygen, which avoids the need for a separate auxiliary system for this purpose, while also providing tight thermal coupling between the burner 203 and the fuel reformer assembly 204.

Embodiments of the present invention are also directed to arrangements of multiple fuel cells in a common plane that connects the cells in electrical parallel. Each planar arrangement of fuel cells forms one layer in a fuel cell stack containing multiple layers. The multiple layers are connected in electrical series to achieve the necessary voltage characteristics for a fuel cell stack. To electrically isolate the fuel cell layers, a high temperature insulating gasket can be placed between the layers, which also provides some sealing between layers. In some embodiments, multiple stacks of fuel cell layers may be placed side by side.

Figure 3:
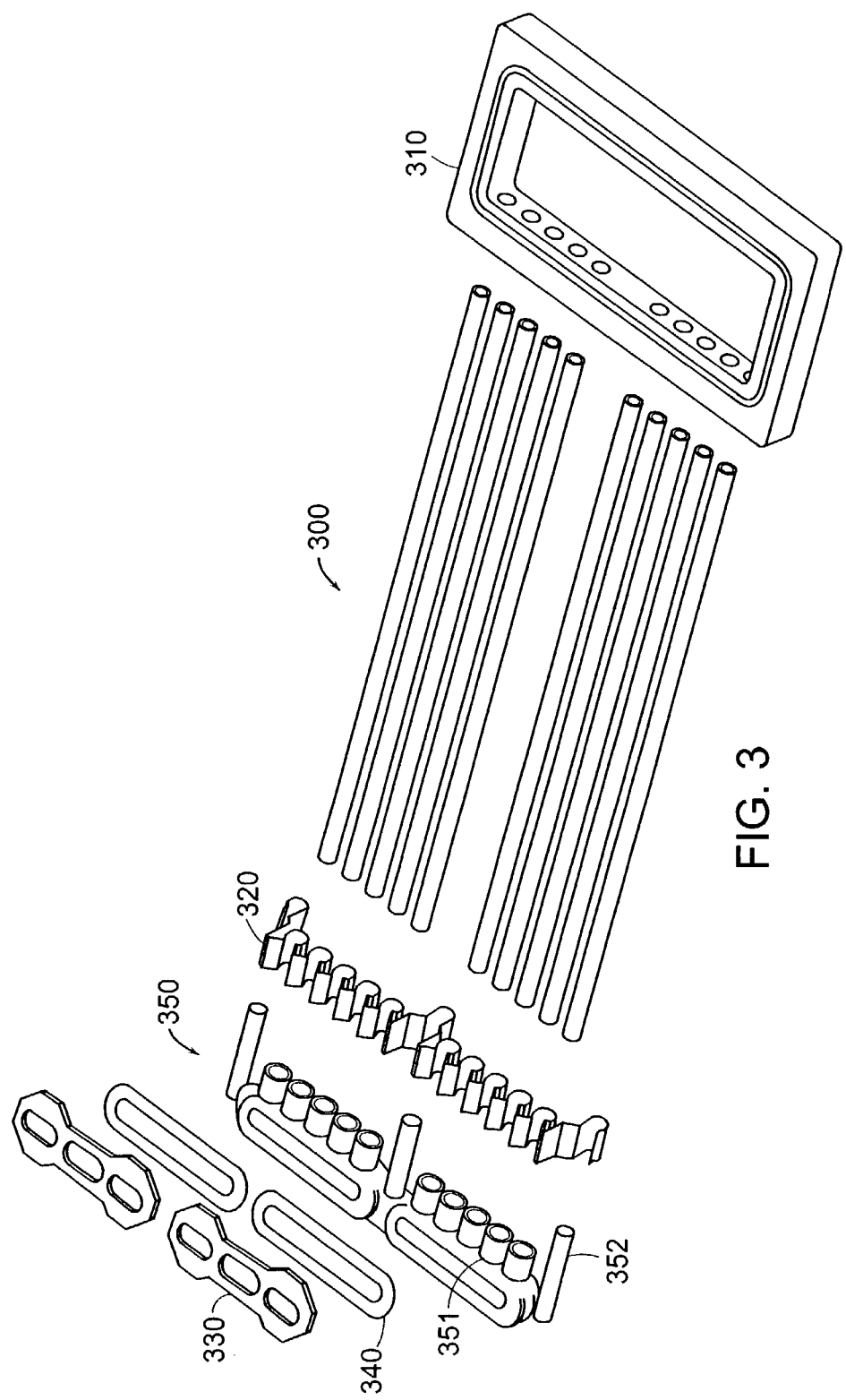
FIG. 3 shows an exploded view of a single layer of a layered fuel cell stack design according to one specific embodiment.

FIG. 3 shows an exploded view of a single layer of a layered fuel cell stack design, in accordance with one specific embodiment of the invention. Tubular solid oxide fuel cells 300 extend horizontally through a ceramic exhaust plenum 310. The exhaust plenums 310 of multiple fuel cell layers typically may be topped by a heat exchanger, which may be made of ceramic, to warm incoming air for recirculation over the outside of the fuel cells 300. Other applications such as household heating can also be served by passing air or water pipes through the exhaust plenum 310 (or the heat exchanger) by which the air or water in the pipes will be heated.

A corrugated-ribbon design current collector 320, for example made of silver-coated nickel or Inconel, makes a snap fit with the outer (cathode) layer of solid oxide fuel cells 300. Thermally and electrically insulating ceramic insulators 330 are placed between layers of the fuel cell stack, as are gasket seals 340, which are compressed to form a seal, and may be made, for example of mica. Fuel input manifold 350

(made, for example, of nickel or stainless steel) contains projections 351 through which fuel is input to the interior of the fuel cells 300, and also has projections 352 for electrically connecting to the next stack layer above. In this fashion, each layer of fuel cells 300 is electrically in parallel, and is placed in series with the layers of tubes above and below it. Fuel cells 300 may be brazed or mechanically fastened directly to the input manifold 350 such as for example, by inductive brazing.

Figure 4:
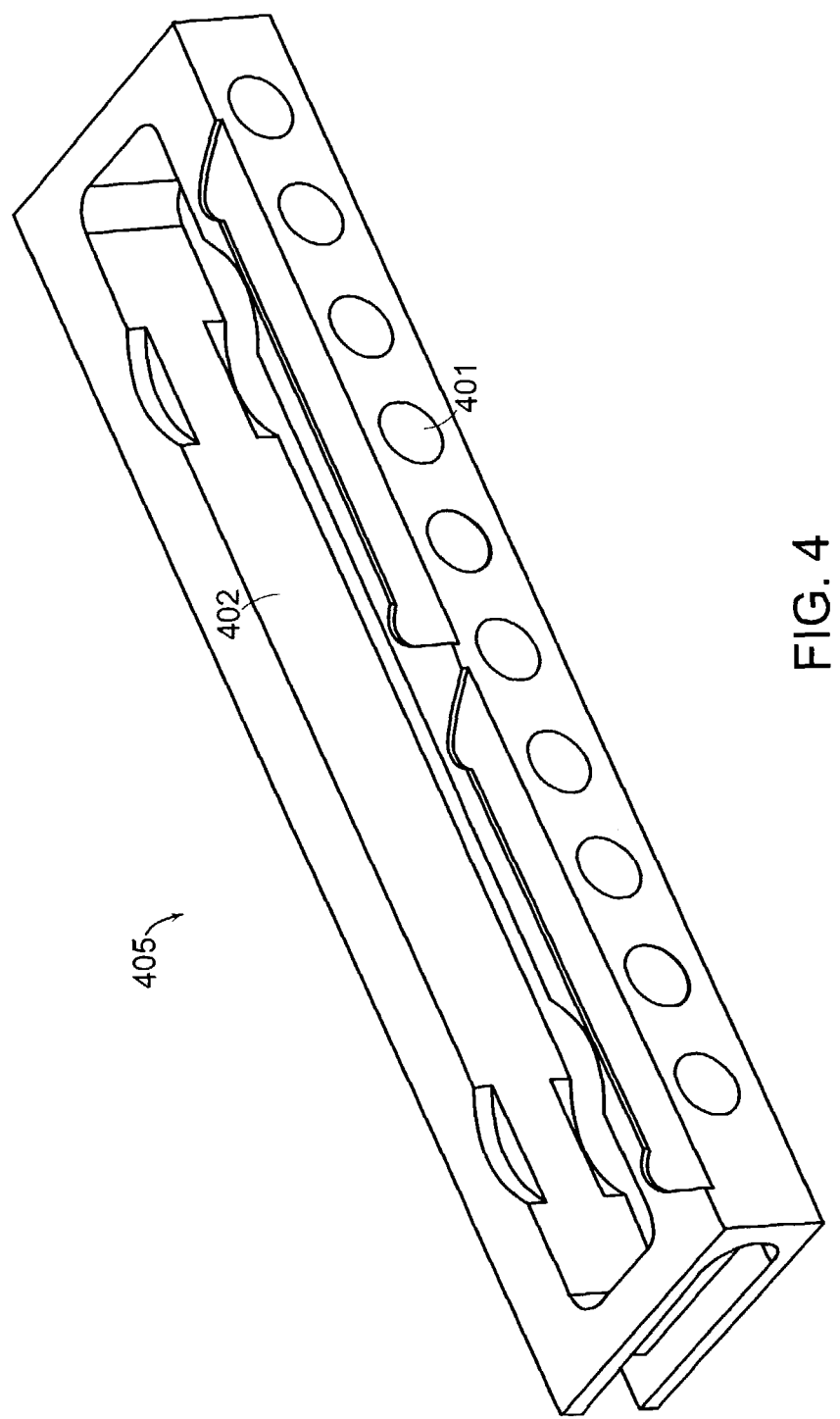
FIG. 4 shows an alternative embodiment of a planar fuel manifold.

FIG. 4 shows an alternative embodiment of a planar fuel manifold 405. The manifold 405 includes fuel cell receptacles 401 in a common plane which receive individual fuel cells. The receptacles 401 may be threaded to accommodate threaded end caps of the fuel cells 300, or the receptacles 401 may be adapted to accept a press fit of the end caps. The interior of the manifold 405 includes a fuel distribution plenum 402 which delivers the fuel mixture to the interior of the individual fuel cells. The manifold 405 is made of an electrically conductive metal such as stainless steel and connects electrically to the inner surface of the fuel cells (anode) so that all the fuel cells connected to the manifold are electrically in parallel.

Using a solid oxide fuel cell system based on layers of tubular fuel cells, cell tube power might typically be in the range of 5-20 watts, with a cell tube density of 220-430 mW/cm$^2$. Such an arrangement would be expected to produce from 8-10 kW of alternating current at 37-42% efficiency (net AC/LHV). Full power would typically be available about 10 to 60 minutes after a cold start.

Since SOFC's operate at temperatures between 750 and 1000° C., material and process selection can be critical. One specific embodiment of the present invention is directed to an electrically conductive, leak-tight, ceramic-to-metal bond in an electrode supported fuel cell that integrates a high-temperature seal for separating fuel and air mixtures with the electrode current collector function of the fuel cell 100. The seal is made through brazed or other metal to metal joint which attaches the main body of the fuel cell 100 (i.e., anode) to the metallic structure of the fuel manifold 405. Such a seal directs a flow of fuel into the interior of the fuel cell 100 without allowing contact with air on the outside of the cell, while also acting as an electrical connection with the body of the fuel manifold 405, which then acts as an electrode bus. By combining these two functions, significant cost reductions can be achieved.

A tubular fuel cell 100 may be composed, for example, of nickel oxide (NiO) coated with yttria-stabilized zirconia (YSZ=$Y_2O_3(Zr_2O_3)$) or YSZ-composite ceramic. Metallic components such as nickel (Ni) and iron (Fe) making up an end cap 14 can be bonded to such a tubular fuel cell 100 by brazing with one of various alloys having various percentages of gold (Au), palladium (Pd), silver (Ag), and nickel. Bonding temperatures can range from 940 to 1450° C. depending on bond-metal composition. Bonding can be performed in air, inert gas, high vacuum, or reducing atmospheres. For example, the surface of a fuel cell 100 may be inductively brazed to the end cap 14 using such an alloy. Alternatively, the anode surface of the fuel cell 100 may be directly brazed to the fuel manifold 405, for example, by inductive brazing. In any such embodiment, the seal is made to the surface of the anode, and the cathode and electrolyte layers would terminate short of the fuel manifold 405.

After bonding, the resulting ceramic-to-metal joints can withstand pressures of at least 40 psi, for example. A low contact-resistance interface between the ceramic fuel cell 100 and the metallic end cap 14 can then be developed by thermal treatment of the joint. After thermal processing, the seal joint has contact resistance values on the order of 0.001 mΩ and remains leak-tight. The end cap 14 may be threaded or adapted to be press fitted into the fuel manifold 405.

Figure 5A:
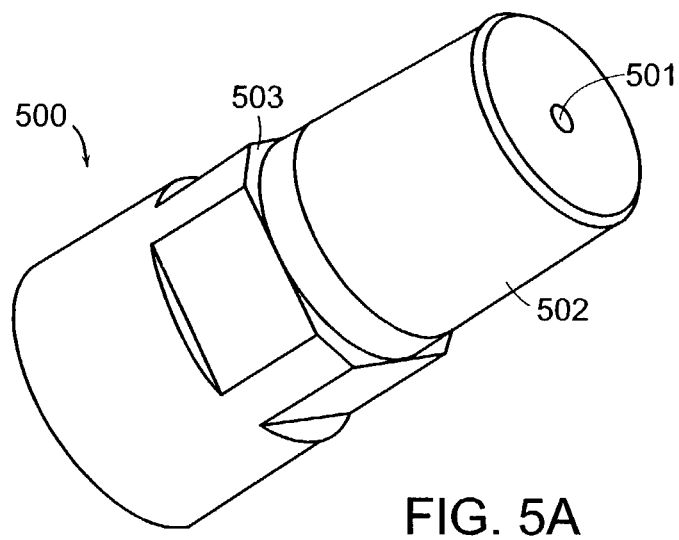
FIGS. 5A and 5B show one specific embodiment of a sealing end cap that provides electrical connection according to one embodiment of the present invention.
Figure 5B:
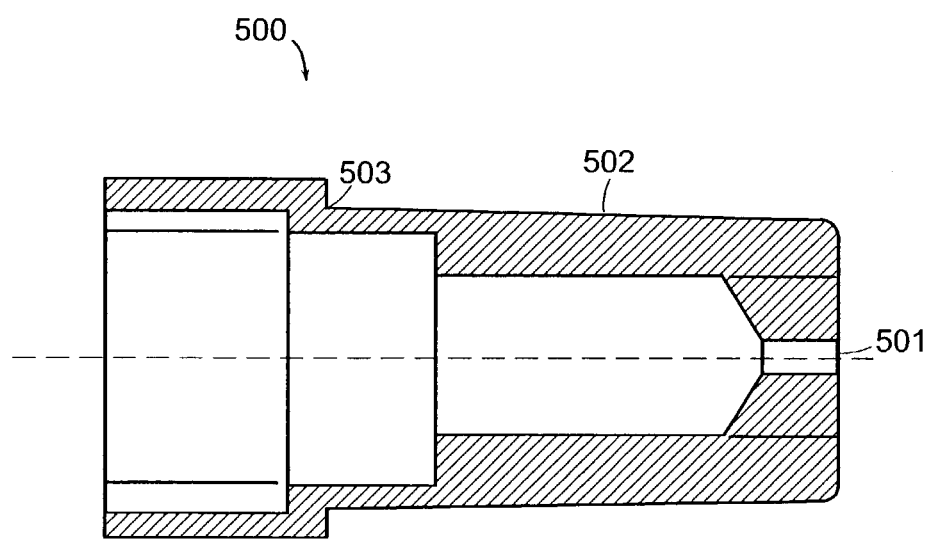

FIG. 5A shows an elevated side view and FIG. 5B shows a cross-sectional view of one specific embodiment of such an end cap 500 that connects a fuel cell 100 to a fuel manifold 405. A seal is created on the outside tube diameter of the fuel cell 100 via a bond between the YSZ coating and the metallic structure of the end cap 500, and current collection occurs across the bond between the inside diameter of the fuel cell 100 and the end cap 500.

The end cap 500 also includes at one end a fuel inlet orifice 501 that allows a fuel mixture to enter the interior of a fuel cell 100 from the fuel distribution plenum 402 of the fuel manifold 405. A connecting ferrule 502 portion of the end cap 500 mates with the side walls of the fuel cell receptacle 401 either by threading or by press fitting. A stop ledge 503 lands against the face of the fuel manifold adjacent to the fuel cell receptacles 401 when the end cap 500 is completely mated to the fuel manifold 405.

Embodiments of the present invention are also directed to a low temperature seal for connecting an electrolyte supported fuel cell to the fuel manifold so as to keep fuel flowing inside the cell while air passes over the outside of the cell. Embodiments incorporate into the fuel cell body an additional length of transitional fuel cell structure so that the fuel cell penetrates an insulation wall, which allows formation of a seal at relatively low temperatures. By achieving a temperature of less than 400° C. at the seal, a wide variety of seal mechanisms are feasible which are not possible at the operating temperature of the fuel cell, around 800° C. Thus, the inside cavity of the fuel cell stack operates at high enough temperature so that yttria-stabilized zirconia (YSZ) remains electrically conductive, which in turn allows for significant power generation.

Figure 6:
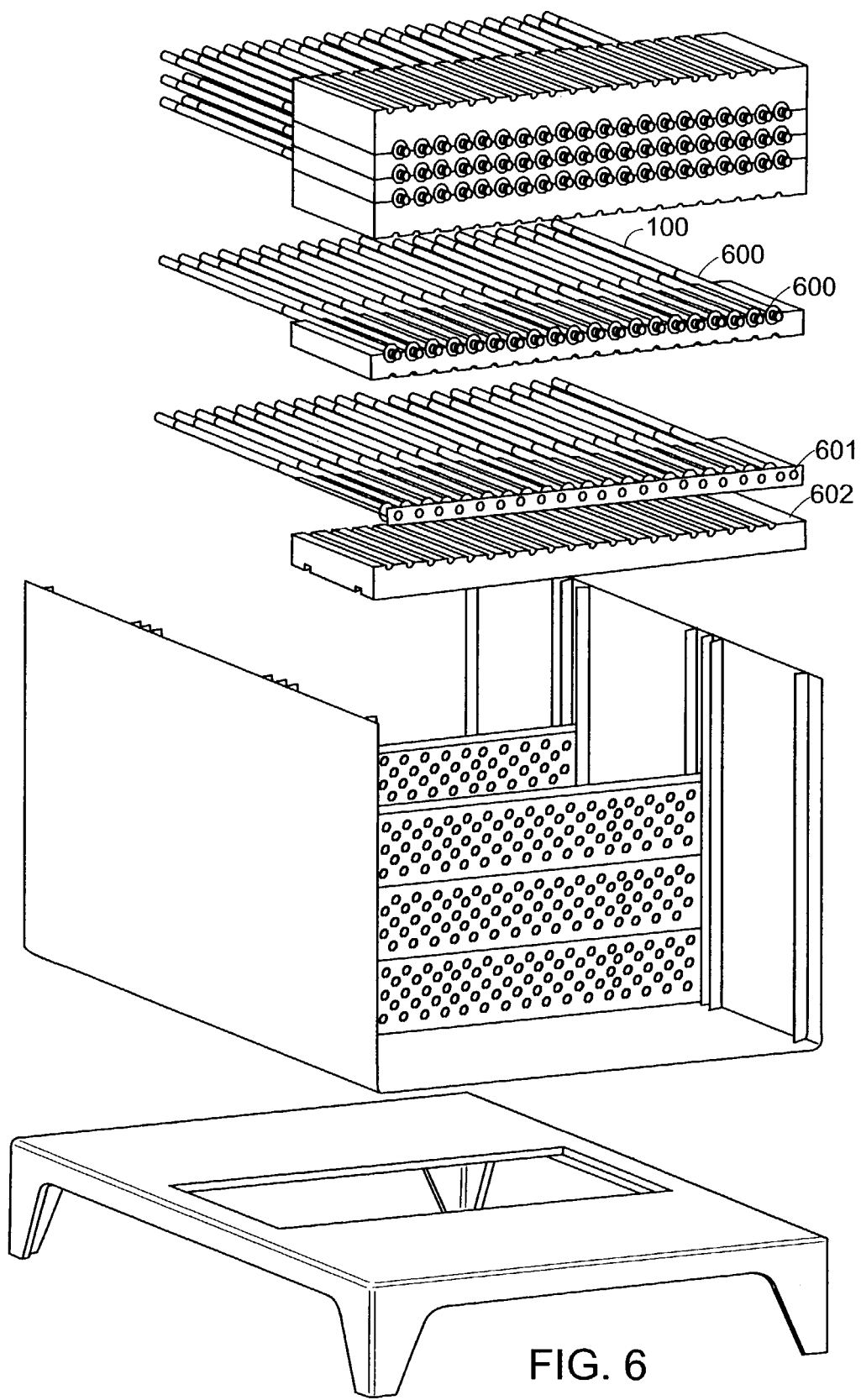
FIG. 6 is an elevated exploded view of one specific embodiment of an SOFC system using a low temperature seal.

FIG. 6 is an elevated exploded view of a one specific such embodiment of an SOFC system. As explained above, each fuel cell 100 includes a length of transition structure 600 sufficiently long to allow the fuel cell 100 to penetrate both a cell manifold 601 and an insulating block 602. Both the tubular structure of the fuel cell (acting as the anode) and a cathode wire are brought through the insulating block 602 and through the cell manifold 601. The end of the fuel cell 100 is then sealed to this cell manifold 601 at relatively low temperature using conventional seal techniques. As explained above, in some embodiments the seal can act in a dual capacity both as a mechanical seal, and as an electric current collector.

Figure 7:
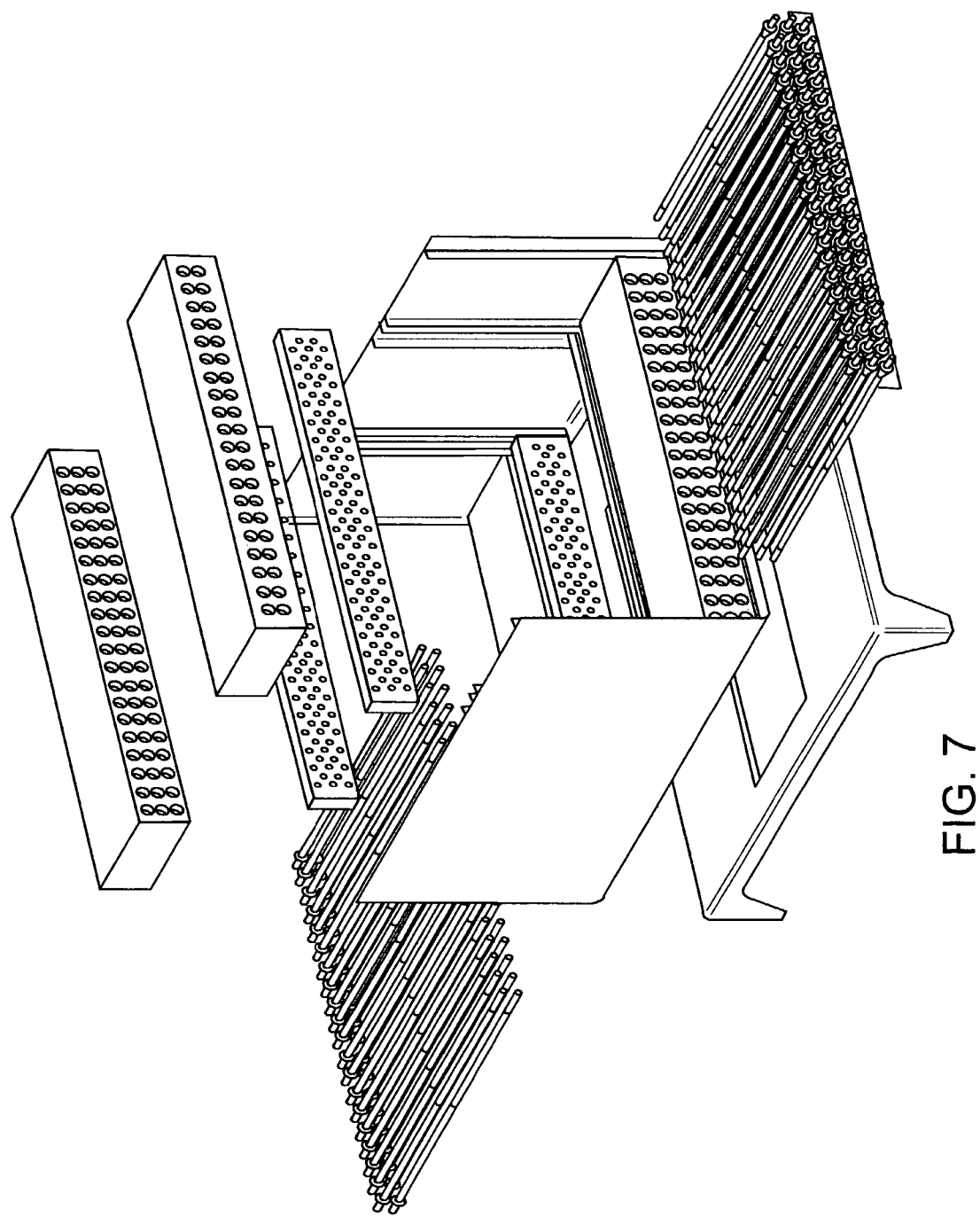
FIG. 7 shows an alternative embodiment of the system in FIG. 6.

FIG. 7 shows an alternative embodiment in which fuel cells are inserted through a metallic fuel manifold and an insulation block from opposing sides. Loading of tubes from opposing sides results in better thermal balance and closer cell packing. Another embodiment (not shown) allows for air to pass between the insulation block and fuel manifold. The incoming air passing in this channel allows for active cooling of the seal. This configuration also allows for the heat loss through the insulation block to be recovered by the incoming process air prior to it going to the cell stack.

Although various exemplary embodiments of the invention have been disclosed, it should be apparent to those skilled in the art that various changes and modifications can be made which will achieve some of the advantages of the invention without departing from the true scope of the invention.

What is claimed is:

1. A fuel cell system comprising:
   a. a plurality of fuel cells for chemically converting a fuel mixture into electric current, each fuel cell having an inner anode layer forming an anode, an electrolyte layer disposed on the inner anode layer, and an outer cathode layer disposed on the electrolyte layer, each fuel cell also having a metallic end cap bonded to the fuel cell such that a seal is made via a bond between the metallic structure of the end cap and a surface of the anode on an outside diameter of the fuel cell and current collection occurs across a bond between an inside diameter of the fuel cell and the end cap, the end cap including an orifice for allowing flow of fuel to an interior of the fuel cell, wherein the cathode and electrolyte layers terminate short of the manifold so as to allow the seal to be made to the surface of the anode on the outside diameter of the fuel cell;

b. a cell manifold for supporting the plurality of fuel cells and for delivering the fuel mixture to interior portions of the fuel cells, the manifold having a plurality of fuel cell receptacles in fluid communication with a fuel distribution plenum, each fuel cell receptacle mating with a connecting ferrule portion of the end cap of a fuel cell, such mating providing electrical connectivity between the manifold and the end caps and also providing for delivery of fuel from the fuel distribution plenum to the interior portions of the fuel cells through the end cap orifices; and c. wherein the seal includes a leak-tight ceramic-to-metal joint.

2. A fuel cell system according to claim 1, wherein the plurality of fuel cells are solid oxide fuel cells (SOFC's).

3. A fuel cell system according to claim 1, wherein each seal is based on an alloy of at least one of gold, silver, palladium, or nickel.

4. A fuel cell system according to claim 3, wherein the seal is based on inductive brazing of the alloy.

5. A fuel cell system according to claim 1, wherein the anode surface of the fuel cell is based on a composite ceramic material.

6. A fuel cell system according to claim 5, wherein the composite ceramic material is yttria-stabilized zirconia (YSZ).

7. A fuel cell system according to claim 1, further comprising a current collector that makes a snap fit with the outer cathode layers of the fuel cells.

8. A fuel cell system according to claim 1, wherein the outer cathode layer is based on lanthanum manganate.

9. A fuel cell system according to claim 1, wherein the cell manifold is one of a plurality of cell manifolds, wherein each manifold holds a plurality of fuel cells in a common plane, and wherein the fuel cells attached to each manifold are connected in electrical parallel.

10. A fuel cell system according to claim 9, wherein the cell manifolds are arranged in a vertical stack of fuel cells, and wherein the cell manifolds are connected in electrical series.

11. A fuel cell system according to claim 1, wherein each end cap includes a stop ledge that abuts the cell manifold when the end cap is completely mated to the cell manifold.

12. A fuel cell system according to claim 11, wherein the end cap is adapted for threading or press fitting of the end cap to the fuel cell manifold.

* * * * *